(12) United States Patent
Zou

(10) Patent No.: US 11,382,441 B2
(45) Date of Patent: Jul. 12, 2022

(54) PORTABLE FILTER

(71) Applicant: Qingdao Ecopure Filter Co., Ltd, Qingdao (CN)

(72) Inventor: Zhibin Zou, Qingdao (CN)

(73) Assignee: QINGDAO ECOPURE FILTER CO., LTD., Qingdao (CN)

( * ) Notice: Subject to any disclaimer, the term of this patent is extended or adjusted under 35 U.S.C. 154(b) by 261 days.

(21) Appl. No.: 16/395,746

(22) Filed: Apr. 26, 2019

(65) Prior Publication Data
US 2020/0337486 A1 Oct. 29, 2020

(51) Int. Cl.
*A47G 21/18* (2006.01)
*C02F 1/00* (2006.01)

(52) U.S. Cl.
CPC ............ *A47G 21/188* (2013.01); *C02F 1/002* (2013.01)

(58) Field of Classification Search
CPC ......... B01D 29/56; B01D 35/30; C02F 1/002; C02F 1/283; C02F 1/444; A47G 21/188
See application file for complete search history.

(56) References Cited

U.S. PATENT DOCUMENTS

| | | | | |
|---|---|---|---|---|
| 2008/0105618 A1* | 5/2008 | Beckius | ............... | B01D 63/024 210/650 |
| 2008/0314933 A1* | 12/2008 | Leonoff | ................. | B65D 23/00 222/215 |
| 2017/0240449 A1* | 8/2017 | Barlow | ................... | C02F 1/283 |

* cited by examiner

*Primary Examiner* — Waqaas Ali
(74) *Attorney, Agent, or Firm* — Calfee, Halter & Griswold LLP

(57) ABSTRACT

In a method for cleaning a portable filter assembly including an elongated housing and a mouthpiece assembled with an outlet end port of the housing, the mouthpiece is disassembled from a female threaded portion of the outlet end port. A male threaded end connection of a cleaning fluid source is assembled to the female threaded portion of the outlet end port. A pressurized cleaning fluid is supplied from the cleaning fluid source to the outlet end port and through a filter element disposed in a fluid passage of the housing to expel the cleaning fluid and trapped contaminants from an inlet end port of the housing.

20 Claims, 5 Drawing Sheets

PORTABLE FILTER

FIELD OF THE DISCLOSURE

The present disclosure is directed generally to a portable liquid purification device, and, more particularly, a water purification device orally operable as a straw.

BACKGROUND OF THE DISCLOSURE

Liquid purification devices may take various forms dependent upon a designated use. In some cases, a portable liquid purification device may be configured to be operable as a straw for filtering water. The purification devices serve to remove harmful components and microbes in unfiltered water, for example, harmful bacteria, parasites, viruses, and/or various minerals. These portable filters can have many uses, for example, a filtration straw could provide a clean source of water to a lost hiker, or clean water to individuals in countries with limited industrialized water purification.

A basic filtration straw may include an inlet, a filter, and an outlet. The inlet of the portable filter is configured to be inserted into a water source, for example, a stream, puddle, or lake. Water is then sucked through the filter portion, in response to suction applied to the outlet, to provide clean water at the outlet. As the portable filter is used and re-used, eventually the filter may become dirty and lose some of its filtration efficiency. The filter may be removed from the filtration straw for cleaning or replacement.

SUMMARY OF THE DISCLOSURE

In an exemplary embodiment of the present application, a portable filter assembly includes an elongated housing having a flow passage extending between an inlet end port and a female threaded outlet end port, wherein at least a portion of the flow passage is defined by a first chamber retaining a first filter element, and a mouthpiece including a male threaded base threadably assembled and sealingly connected with the female threaded outlet end port of the elongated housing to allow fluid to be drawn through the flow passage and into the mouthpiece when suction is applied to the mouthpiece.

According to another exemplary embodiment of the present application, a method is contemplated for cleaning a portable filter assembly including an elongated housing and a mouthpiece assembled with an outlet end port of the housing. In an exemplary method, the mouthpiece is disassembled from a female threaded portion of the outlet end port. A male threaded end connection of a cleaning fluid source is assembled to the female threaded portion of the outlet end port. A pressurized cleaning fluid is supplied from the cleaning fluid source to the outlet end port and through a filter element disposed in a fluid passage of the housing to expel the cleaning fluid and trapped contaminants from an inlet end port of the housing.

According to another exemplary embodiment of the present application, a portable filter assembly includes a mouthpiece having a water outlet and a water inlet having a male thread connector, and a housing having an inlet and an outlet and an upwards channel for a liquid from said inlet to said outlet. The housing contains an ultrafiltration membrane. A female threaded connector is integrally formed on the inlet of the housing, and a female threaded connector is integrally formed on the outlet of the housing. The male threaded connector of the mouthpiece threadably connects with the female threaded connector on the outlet of the housing. After removing the mouthpiece, the female thread connector on the outlet of the housing can sealingly and threadably connect with a clean water resource and wash the ultrafiltration membrane by a downwards water flow.

BRIEF DESCRIPTION OF THE DRAWINGS

The following figures depict certain illustrative embodiments of the invention in which like reference numerals refer to like elements. These depicted embodiments are to be as illustrative embodiments of this disclosure and not as limiting in any way.

DETAILED DESCRIPTION

Figure 1:
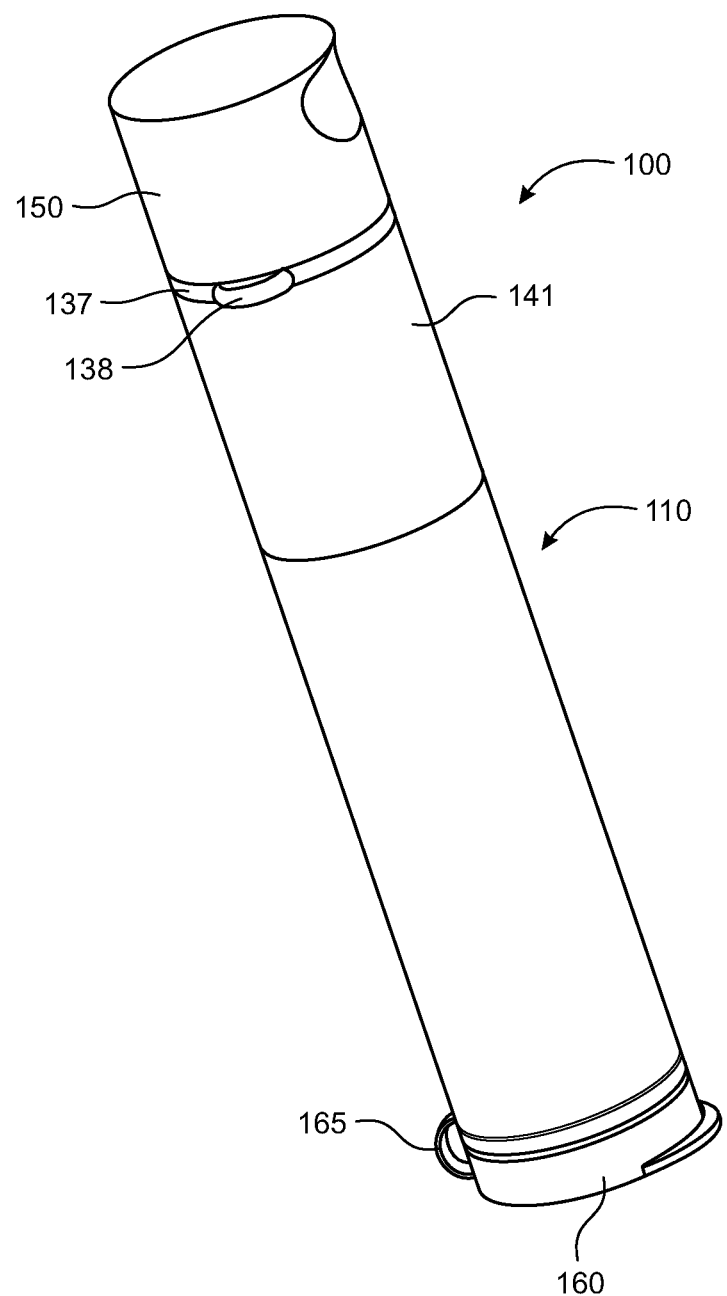
FIG. 1 is a perspective view of a portable filter assembly, according to an exemplary embodiment of the present application.
Figure 2:
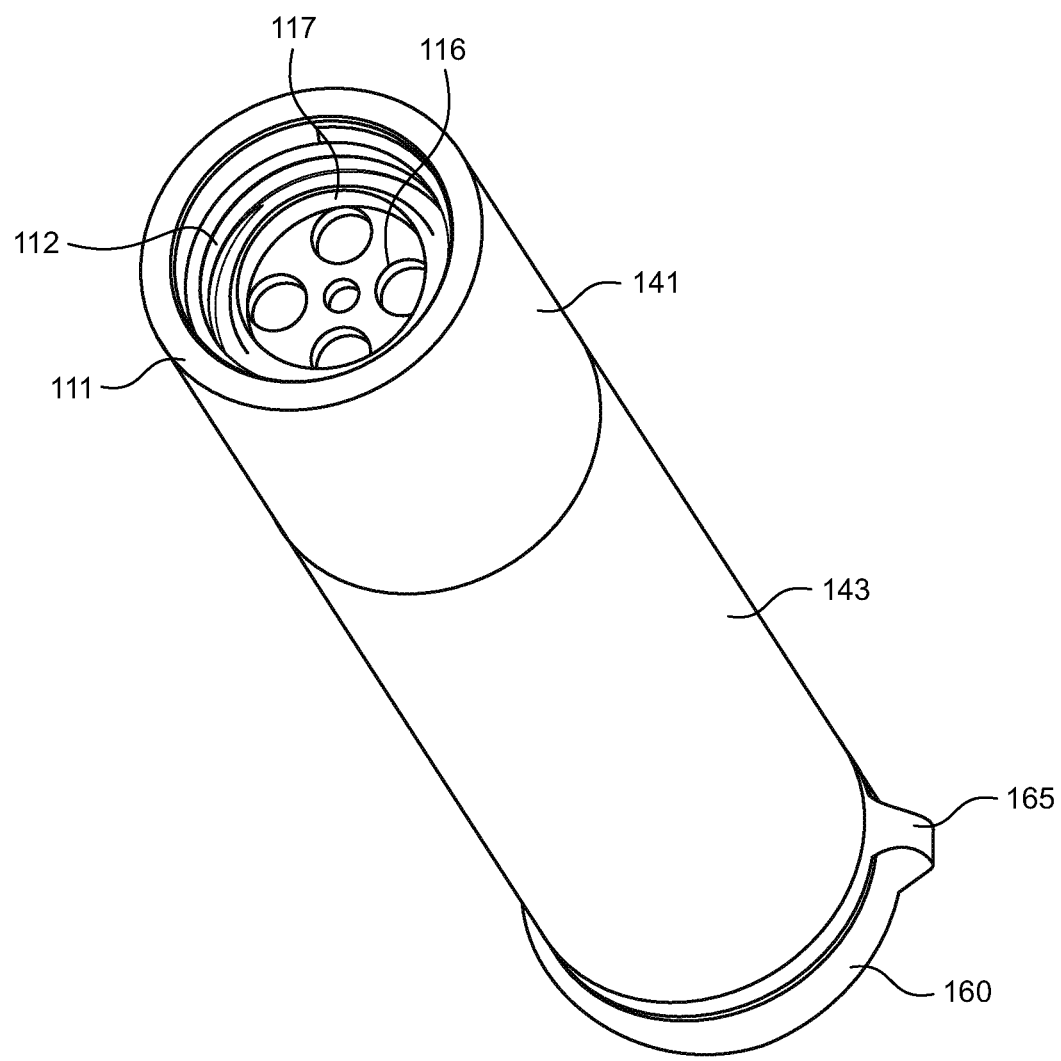
FIG. 2 is an upper perspective view of the portable filter assembly of FIG. 1, shown with the sealing cap and mouthpiece removed to illustrate additional features of the filter assembly.

The embodiments disclosed herein are exemplary only, and the subject matter described may be embodied in various forms. Therefore, specific details disclosed herein are not to be interpreted as limiting the subject matter as defined in the accompanying claims.

Referring now to the drawings in detail, FIGS. 1-10 illustrate an exemplary portable filter assembly 100 sized and configured for use, for example, as a drinking straw. As best shown in the cross-sectional views of FIGS. 3-4, the portable filter assembly 100 includes a housing 110 enclosing a filtration arrangement 120 (FIGS. 3-4), described in greater detail below, a mouthpiece 130 assembled with an outlet end port 111 of the housing, a sealing cap 150 removably assembled over the mouthpiece, and a cover 160 assembled with an inlet end port 113 of the housing. In some embodiments, various elements of the portable filter assembly may be altered in dimension, or otherwise formed to adjust for a user's need. For example, in some embodiments, a mouthpiece, housing, and sealing cap may be more elongated and narrow than those illustrated in FIGS. 1-10.

Figure 3:
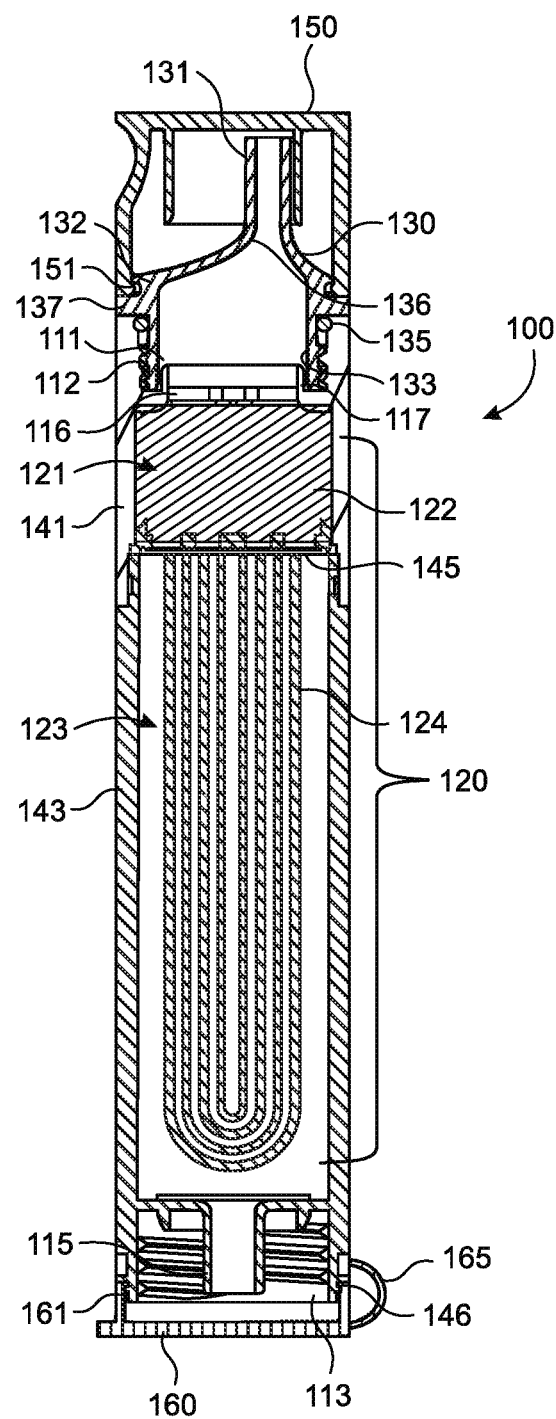
FIG. 3 is a side cross-sectional view of the portable filter assembly of FIG. 1.
Figure 4:
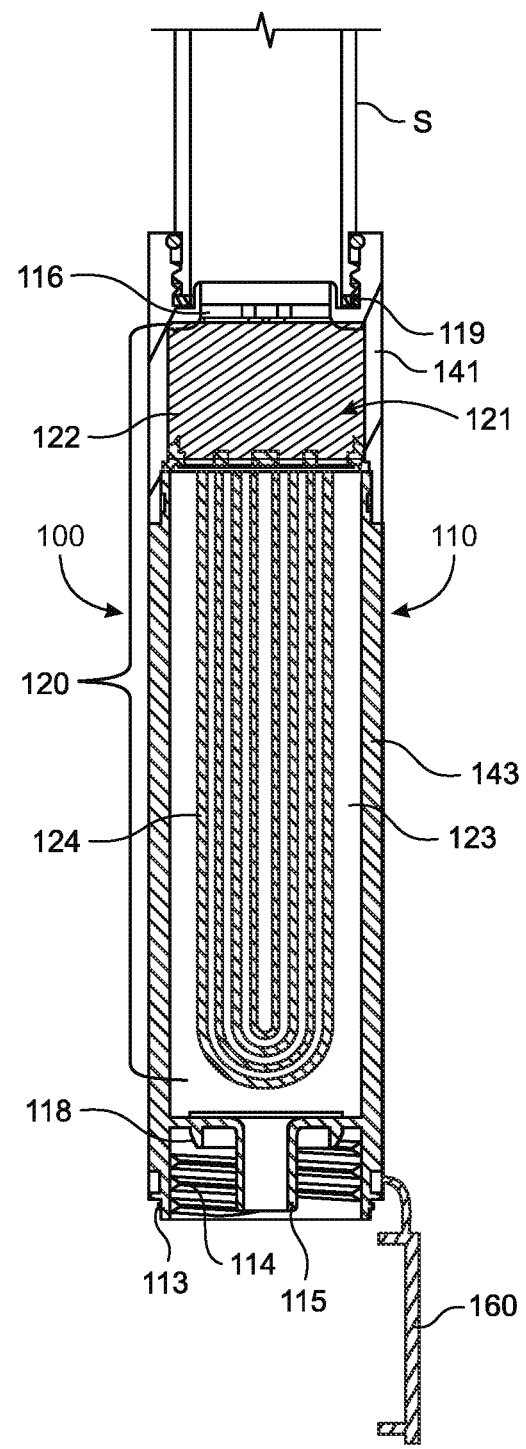
FIG. 4 is a side cross-sectional view of the portable filter assembly of FIG. 1, shown assembled with a cleaning fluid source.
Figure 10:
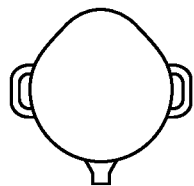
FIGS. 5-10 are front, rear, left side, right side, top, and bottom views of the portable filter assembly of FIG. 1.
Figure 5:
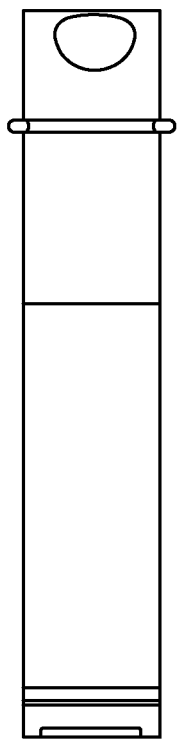
Figure 6:
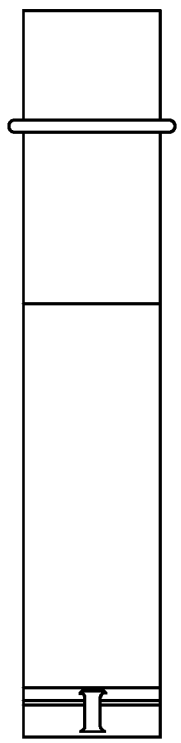
Figure 7:
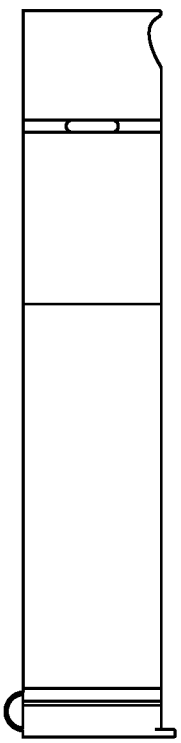
Figure 8:
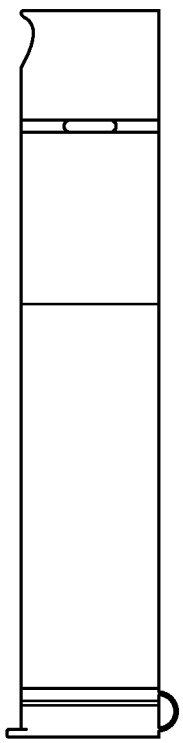
Figure 9:
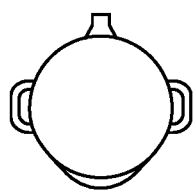

As shown in the cross-sectional views of FIGS. 3-4, the exemplary mouthpiece 130 includes an outlet portion 131 defining a nozzle and an inlet portion 133 defining a connector. The mouthpiece nozzle 131 may take a variety of shapes. In the exemplary embodiment, the nozzle is necked down and eccentrically disposed on the mouthpiece 130, offset from a central axis of the mouthpiece. In alternative embodiments, the nozzle may be angled, tapered or otherwise contoured or shaped, for example, to facilitate insertion of the nozzle into, and the application of suction by, the mouth of the user. A channel 136 extends through the mouthpiece from the outlet portion 131 to the inlet portion 133, such that a liquid may be sucked through the channel, as with a conventional drinking straw. The mouthpiece 130 may be formed from any suitable material, e.g., durable materials considered safe for oral contact (e.g., silicone or other suitable elastomers, ABS or other suitable plastics, stainless steel or other suitable metals).

In the exemplary embodiment, the sealing cap 150 is removably attached to the mouthpiece 130 to cover and protect the mouthpiece from damage and external contamination when the filter assembly 100 is not in use. The sealing cap may be provided in a flexible material to allow for a snap fit or interference fit between an outer rim 151 of the sealing cap 150 and a peripheral groove 132 on the mouthpiece 130. In other embodiments, the sealing cap may be provided with other connecting arrangements for connecting with the mouthpiece and/or housing, such as, for example, internal threads or flexible prongs. The sealing cap may be formed from a variety of suitable materials, including, for example, elastomers (e.g., silicone), plastics (e.g., ABS), or metals (e.g., aluminum, stainless steel).

The cover 160 is removably attached to the housing inlet end port 113, for example, to cover and protect the inlet end port of the housing from damage and external contamination when the filter assembly 100 is not in use. The cover may be provided in a flexible material to allow for a snap fit or interference fit between an outer rim 161 of the cover 160 and a peripheral groove 146 on the housing. The exemplary cover 150 includes a tether portion 165 that engages the housing 110 to secure the cover with the filter assembly when the cover is disengaged from the housing inlet end. In other embodiments, the cover may be provided with other connecting arrangements for connecting with the mouthpiece and/or housing, such as, for example, internal threads or flexible prongs. The cover may be formed from a variety of suitable materials, including, for example, elastomers (e.g., silicone), plastics (e.g., ABS), or metals (e.g., aluminum, stainless steel).

In a method of using the exemplary portable filter assembly 100, the sealing cap 150 is removed from the mouthpiece 130 and the cover 160 is disengaged from the housing inlet end port 113. The inlet end port is inserted into a fluid (e.g., water) source, and the mouthpiece 130 is inserted into the user's mouth. Suction applied to the mouthpiece causes fluid from the fluid source to be sucked into the housing inlet end, through an internal filter arrangement within the housing, into the mouthpiece, and into the user's mouth, such that the fluid is filtered through the filter 120 arrangement to remove contaminants from the fluid.

The mouthpiece may be sealingly connected to the housing outlet end using a variety of arrangements, including, for example, press fit, threaded, clamped, or gasketed engagement. In the exemplary embodiment, the inlet connector 133 of the mouthpiece 130 is provided as a male threaded connector for threaded installation in a female threaded portion 112 defined by the outlet end port 111 of the housing 110. The male threaded connector 134 may be provided, for example, with an O-ring seal 135 to effect a leak-tight seal between the housing 110 and the mouthpiece 130, to facilitate the suction or pressurized flow of water through the housing 110 of the filter assembly 100. As shown in FIG. 1, an outer rim portion 137 of the mouthpiece may include one or more user graspable projections 138 to facilitate user assembly and disassembly (i.e., screwing and unscrewing) of the mouthpiece 130 with the housing outlet end port 111.

The filtration arrangement 120 enclosed in the housing 110 is configured to filter fluid flowing into and through the housing, for example, by user suction applied to the mouthpiece 130, or pressurized fluid applied to the housing inlet 113. The filtration arrangement may include any one or more of a variety of filter elements, including, for example, a carbon block filter element, a hollow fiber filter element, a microscreen filter element, a sintered element, and/or an ultrafiltration membrane.

Over time, usage of the filtration arrangement may lead to clogging or excessive contamination of the filter element(s), resulting in less effective filtration or reduced flow rates. In an exemplary method of cleaning a portable filter, a mouthpiece is decoupled from an outlet connector at an outlet end of the filter-retaining housing to expose the outlet connector, and a cleaning fluid source is sealingly coupled to the outlet connector. A pressurized cleaning fluid is supplied from the cleaning fluid source to the outlet end of the filter-retaining housing and through the filter arrangement to expel contaminants though an inlet end port of the housing. In one such method, the outlet connector of the housing may comprise a female threaded connector for connection with a male threaded end of a water hose.

According to an aspect of the present disclosure, in the illustrated embodiment, the female threaded port 112 at the outlet end 111 of the housing 110 may be configured for attachment to a pressurized fluid source, such as, for example, a water hose or spigot S (see FIG. 4), when the mouthpiece 130 is disassembled from the housing 110. The application of pressurized fluid to the outlet end of the housing forces backflow through the filtration arrangement 120 to purge contaminants from the filter element(s) and expel these contaminants out the inlet end 113 of the filter housing 110. In one such exemplary embodiment, the female threaded port 112 may be provided with ½" or ⅝" standard garden hose thread (GHT) threads for assembly with a standard garden hose spigot. In some embodiments, these pressurized backflow cleansing procedures may extend the lifespan of the filter element(s) at least 30% to 40% beyond an expected lifespan (e.g., about 1000 gallons/4000 liters) of the filter element(s), before replacement of the filter element (s) is advisable.

A washer, gasket or other such seal member may be used to effect a leak-tight seal, and to maintain a water pressure sufficient for backflow cleansing of the filter element(s) (e.g., 25-35 psig). As shown, the outlet end port 111 of the housing may additionally include an inner axial lip 117 radially inward of the female threaded port 112 to define an annular recess for receiving and sealing against a male threaded connector (e.g., a threaded hose end). As shown in FIG. 4, a washer or other gasket seal 119 may be installed in the annular recess to effect a leak-tight seal between filter housing outlet end 111 and the installed male threaded connector of the pressurized fluid source.

In an exemplary embodiment, a housing may be constructed to define multiple chambers for housing multiple filter elements, for example, to effectively filter out multiple types of contaminants from a water source. For example, a carbon block filter element may more effectively remove chemicals and heavily metals from water, while a hollow fiber filter may more effectively remove bacteria and parasites. As shown in the cross-sectional view of FIG. 3, the exemplary housing 110 defines a first or upper chamber 121 enclosing a first filter element 122 (e.g., a carbon block filter element, as shown) and a second or lower chamber 123 enclosing a second filter element 124 (e.g., a hollow fiber filter element, as shown). In the illustrated embodiment, the housing 110 is formed from an upper body member 141 defining the outlet end 111 and the upper chamber 121 of the housing, assembled with a lower body member 143 defining the inlet end 113 and the lower chamber 123 of the housing 110. As shown, the upper chamber 121 may be separated from the lower chamber 123 by a water permeable screen or membrane 145, which may provide for additional filtration of the water being sucked upward through the chambers 123, 121. An apertured radial wall 116 (best shown in FIG. 2) may be disposed radially inward of the axial lip 117, for example, to protect the filter element disposed in the upper chamber 141 while allowing fluid to easily pass through the upper chamber into the mouthpiece.

The housing body members may be sealingly attached to each other using a variety of arrangements, such as crimping, press fit engagement, threaded engagement, welding, or other such configurations. In some embodiments, the housing body members are detachable, for example, for replacement of the enclosed filter elements. The upper and lower body members 141, 143 of the housing 110 may be formed from any suitable material, including, for example, elastomers (e.g., silicone), plastics (e.g., ABS), metals (e.g., aluminum, stainless steel), or any other suitably durable, corrosion resistant material. In one such embodiment, the housing body members are formed from ABS plastic.

According to another aspect of the present disclosure, the inlet end of a portable filter housing may be provided with one or more connections configured to attach the housing to a fluid source, for example, to facilitate suction of fluid from the fluid source. For example, the inlet end may be provided with one or more of a female threaded connection, a male threaded connection, or a tube stub. In the illustrated embodiment, as shown in the cross-sectional view of FIG. 3, the inlet end 113 of the housing 110 includes both a tube stub connection 115, for example, for a press fit connection with a flexible plastic or elastomeric hose, and a female threaded connection 114, for example, for threaded connection with a fluid container (e.g., bottle) or male threaded hose end or spigot. As shown, the inlet end of the housing may additionally include an inner axial lip 118 radially inward of the female threaded port 114 to define an annular recess for receiving and sealing against a male threaded connector (e.g., a threaded hose end). A washer or other gasket seal 119 may be installed in the annular recess to effect a leak-tight seal between filter housing inlet end 113 and the an installed male threaded connector (e.g., for a fluid container).

While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, circuits, devices and components, software, hardware, control logic, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims. Descriptions of exemplary methods or processes are not limited to inclusion of all steps as being required in all cases, nor is the order that the steps are presented to be construed as required or necessary unless expressly so stated.

The invention claimed is:

1. A portable filter assembly comprising:
an elongated housing having a flow passage extending between an inlet end port and a female threaded outlet end port, wherein at least a portion of the flow passage is defined by a chamber retaining a filter element;
a removable mouthpiece including a male threaded base threadably assembled and sealingly connected with the female threaded outlet end port of the elongated housing, to allow fluid to be drawn through the flow passage and into the mouthpiece when suction is applied to the mouthpiece; and
wherein the outlet end port includes:
an inner axial lip radially inward of the female threaded portion of the outlet end port, wherein the inner axial lip defines an annular recess for receiving an end portion of the male threaded base; and
a radial wall including a plurality of apertures disposed radially inward of the axial lip, wherein the apertured radial wall protects the filter element retained by the chamber while allowing fluid to pass into the mouthpiece.

2. The portable filter assembly of claim 1, wherein the chamber comprises an upper chamber and a lower chamber, wherein the filter element is provided in the upper chamber, and wherein the lower chamber retains a second filter element.

3. The portable filter assembly of claim 2, wherein the housing comprises a first body member defining the outlet end port and the upper chamber and a second body member defining the inlet end port and the lower chamber.

4. The portable filter assembly of claim 2, wherein the filter element of the upper chamber comprises a carbon block filter element, and the second filter element of the lower chamber comprises a hollow fiber filter element.

5. The portable filter assembly of claim 1, wherein the inlet end port comprises a tube stub connection.

6. The portable filter assembly of claim 1, wherein the female threaded outlet end port comprises threads for fitment with a garden hose.

7. The portable filter assembly of claim 1, wherein the mouthpiece includes an outer rim portion having a user graspable projection to facilitate user assembly and disassembly of the mouthpiece with the housing outlet end port.

8. The portable filter assembly of claim 1, further comprising a sealing cap removably assembled with the mouthpiece.

9. The portable filter assembly of claim 1, further comprising a cover member removably assembled with the inlet end port.

10. The portable filter assembly of claim 1, further comprising an O-ring seal disposed around the male threaded base of the mouthpiece for sealing engagement with the outlet end port.

11. The portable filter assembly of claim 1, wherein the inlet end port comprises a female threaded port.

12. The portable filter assembly of claim 11, wherein the inlet end port includes an inner axial lip radially inward of a female threaded portion of the inlet end port to define an annular recess.

13. The portable filter assembly of claim 12, wherein the inlet end port further includes a tube stub connection radially inward of the inner axial lip.

14. A portable filter assembly comprising:
a removable mouthpiece having a water outlet and a water inlet having a male thread connector;
a housing having an inlet and an outlet and an upwards channel for a liquid from said inlet to said outlet, wherein the housing contains an ultrafiltration membrane;
a female threaded connector integrally formed on the inlet of the housing;
a female threaded connector integrally formed on the outlet of the housing;
wherein the male threaded connector of the mouthpiece threadably connects with the female threaded connector on the outlet of the housing, wherein the outlet of the housing includes:
an inner axial lip that extends radially inward of the female threaded connector to define an annular recess receiving an end portion of the male thread connector, and
a radial wall including a plurality of apertures disposed radially inward of the axial lip, wherein the apertured radial wall protects the ultrafiltration membrane contained by the housing while allowing fluid to pass into the mouthpiece; and
wherein, after removing the mouthpiece, the female thread connector on the outlet of the housing can sealingly and threadably connect with a clean water resource and wash the ultrafiltration membrane by a downwards water flow.

15. The portable filter assembly of claim 14, wherein the housing includes a first chamber and a second chamber, wherein the first chamber includes the ultrafiltration membrane, wherein the second chamber includes a second different ultrafiltration membrane, and wherein the radial wall protects only the ultrafiltration membrane of the first chamber.

16. The portable filter assembly of claim 15, wherein the mouthpiece includes an outer rim portion having a user graspable projection to facilitate user assembly and disassembly of the mouthpiece with the outlet of the housing.

17. The portable filter assembly of claim 16, wherein the annular recess of the inner axial lip sealing couples to a pressurized cleaning fluid source.

18. The portable filter assembly of claim 1, wherein the annular recess of the inner axial lip sealing couples to a pressurized cleaning fluid source.

19. The portable filter assembly of claim 3, wherein the mouthpiece includes an outer rim portion having a user graspable projection to facilitate user assembly and disassembly of the mouthpiece with the housing outlet end port.

20. The portable filter assembly of claim 19, wherein the annular recess of the inner axial lip sealing couples to a pressurized cleaning fluid source.

* * * * *